United States Patent
McGowan et al.

(10) Patent No.: US 12,507,689 B2
(45) Date of Patent: Dec. 30, 2025

(54) AVIAN DISTRACTOR DEVICE

(71) Applicants: TE Connectivity India Private Limited, Bangalore (IN); TE Connectivity Ireland Limited, Dublin (IE)

(72) Inventors: Brian McGowan, Dublin (IE); Jason Mulligan, Dublin (IE); Ravi S, Bangalore (IN); Praveena Vade, Bangalore (IN); Praveen Kushtagi, Bangalore (IN); Vijay Wasudeorao Tijare, Bangalore (IN)

(73) Assignee: TE CONNECTIVITY SERVICES GMBH ET AL., Schaffhausen (CH)

( * ) Notice: Subject to any disclaimer, the term of this patent is extended or adjusted under 35 U.S.C. 154(b) by 828 days.

(21) Appl. No.: 17/544,475

(22) Filed: Dec. 7, 2021

(65) Prior Publication Data

US 2022/0174937 A1 Jun. 9, 2022

(30) Foreign Application Priority Data

Dec. 7, 2020 (IN) .............................. 202041053180

(51) Int. Cl.
*A01M 29/08* (2011.01)
(52) U.S. Cl.
CPC ................................... *A01M 29/08* (2013.01)
(58) Field of Classification Search
CPC ................................ A01M 29/08; H02G 1/02
USPC ....................................................... 116/22 A
See application file for complete search history.

(56) References Cited

U.S. PATENT DOCUMENTS

| 5,421,266 | A | 6/1995 | Larumbe | |
|---|---|---|---|---|
| 7,770,533 | B2 * | 8/2010 | Ramirez | |
| 8,438,998 | B2 | 5/2013 | Spencer | |
| 8,827,225 | B2 * | 9/2014 | Andersson | H02G 7/00 248/317 |
| 8,869,732 | B1 * | 10/2014 | Chervick | H02G 7/00 116/22 A |
| 9,331,465 | B2 * | 5/2016 | Ortiz | H02G 7/00 |

(Continued)

FOREIGN PATENT DOCUMENTS

| CN | 102422337 | | 4/2012 |
|---|---|---|---|
| CN | 203424209 U | * | 2/2014 |

(Continued)

OTHER PUBLICATIONS

Extended European Search Report, Application No. 21212512.4-1004, Dated: Apr. 28, 2022, 8 pages.

(Continued)

*Primary Examiner* — Kristina M Deherrera
*Assistant Examiner* — Evan Mancini

(57) ABSTRACT

An avian distractor device includes a clamp having a pair of jaws attached to a hinge and biased via a plurality of springs into a closed position, and a locking member disposed in communication with the pair of jaws to rigidly hold a conductor of different sizes under a force generated by the plurality of springs. A spherical diverter is provided and is rotatably attached to the hinge and the clamp. A reflective surface encircles a central portion of the spherical diverter to enhance visibility of the device to wildlife. A plurality of dimples are formed on an external surface of the spherical diverter to reduce a drag force on the device.

19 Claims, 7 Drawing Sheets

(56) References Cited

U.S. PATENT DOCUMENTS

| | | |
|---|---|---|
| 9,706,767 B2 | 7/2017 | Spencer |
| 10,383,326 B2 | 8/2019 | Oosthuyzen |
| 2017/0279258 A1* | 9/2017 | Meseti ................. F16M 13/022 |

FOREIGN PATENT DOCUMENTS

| | | | | |
|---|---|---|---|---|
| CN | 105552782 A | | 5/2016 | |
| CN | 111296405 A | | 6/2020 | |
| ES | 2333397 B1 | * | 11/2010 | ............... H02G 7/00 |
| JP | 2008271676 A | * | 11/2008 | |

OTHER PUBLICATIONS

Rick Harness, Using an Unmanned Aerial Vehicle to install Wire Markers to Mititgate Bird Collisions Env-Vision: Environmental Vision, Dated: May 25, 2016, Retrieved from the Internet: URL:https://epristorage.blob.core.windows.net/documents/Rick%Harness_EDM%20International.pdf (retrieved on Jun. 4, 2019), the whole document, 42 pages.

Chinese Office Action with English translation thereof, dated Apr. 23, 2025 in Application No. 202111467427.0, 19 pages.

* cited by examiner

AVIAN DISTRACTOR DEVICE

CROSS-REFERENCE TO RELATED APPLICATIONS

This application claims the benefit of Indian Patent Application No. 202041053180, filed on Dec. 7, 2020, the whole disclosure of which is incorporated herein by reference in its entirety.

FIELD OF THE INVENTION

The present invention relates to an avian distractor device for preventing collision of birds or other wildlife with overhead obstructions (e.g., power lines, communication lines, or any other overhead obstruction in the wildlife's path).

BACKGROUND

An avian distractor or a bird diverter is a device that is attached to an overhead structure to alert and divert birds and other wildlife away from an object in order to avoid accidents and fatalities. Such devices are particularly useful for power and communication lines that cross lakes or rivers, where birds tend to flock together.

A majority of prior art distractor devices for repelling or alerting wildlife from collision and electrocution risks have a ball, a flapper or an indicator component attached to the conductor line via a clamp. Such prior art devices are coated with materials that do not reflect light so that the color or level of contrast with the environment are not visually recognized by the birds in flight. Such an approach reduces the power line visibility for the wildlife and increases their risk of collision. In some prior art approaches lines are marked with high-visibility devices, but the effectiveness of line marking remains unclear. Additionally, the clamp that holds the conductor lines may be detached due to strong winds or lack of sufficient fixed engagement with the power line. Furthermore, the assembly of the device to the conductor lines are time consuming, difficult in the context of energized lines, and dangerous to persons performing the alterations or assembly. However, differences in efficacy between the types of devices and in some cases conflicting results reduces the ability of these devices to reduce collision risk to the wildlife.

Hence, there is a need in that art to provide a solution to address all the above mentioned problems. The present invention relates to an improved avian distractor device that is relatively inexpensive, easy to assemble, sturdy, durable, modular and easy to install.

SUMMARY

An avian distractor device according to an embodiment of the present disclosure includes a clamp having a pair of jaws attached to a hinge and biased via a plurality of springs into a closed position, and a locking member disposed in communication with the pair of jaws to rigidly hold a conductor of different sizes under a force generated by the plurality of springs. A spherical diverter is provided and is rotatably attached to the hinge and the clamp. A reflective surface encircles a central portion of the spherical diverter to enhance visibility of the device to the wildlife. A plurality of dimples are formed on an external surface of the spherical diverter to reduce a drag force on the device.

BRIEF DESCRIPTION OF THE DRAWINGS

The invention will now be described by way of example with reference to the accompanying Figures, of which.

DETAILED DESCRIPTION OF THE EMBODIMENTS

Figure 1:
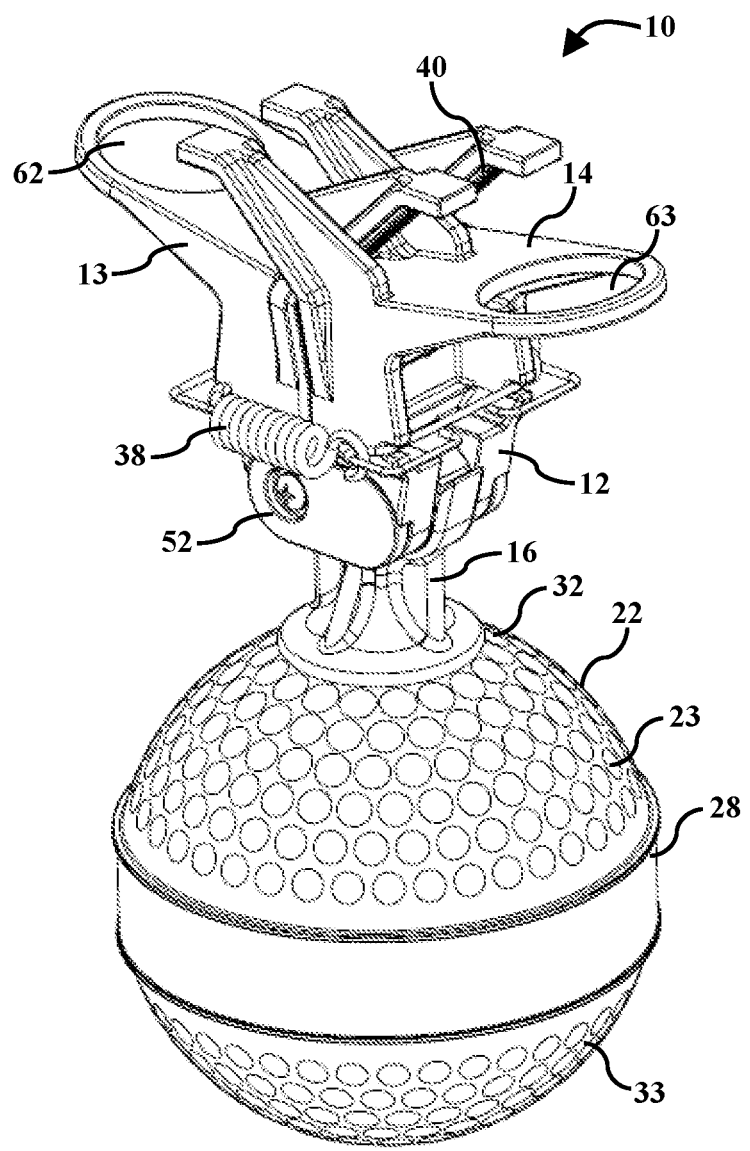
FIG. 1 illustrates a perspective view of an avian distractor device for preventing collision of birds and other wildlife with overhead structures (i.e. power lines), in accordance with an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present invention relates to an avian distractor device for preventing collision of birds and other wildlife with overhead structures (e.g., power lines, communication lines and structures). The avian distractor device is relatively inexpensive, easy to assemble, sturdy, durable, modular and easy to install. The avian distractor device is capable of reducing wind loading on the overall component and on a connection zone between a clamp and an indicator in windy conditions. The avian distractor device is also capable of increasing low light dawn/dusk visibility to wildlife and is attached to a variety of structures.

Referring to FIG. 1, a perspective view of an avian distractor or diverter device (10) for preventing collision of birds and other wildlife with overhead power lines is illustrated in accordance with an exemplary embodiment of the present invention. Note that in FIGS. 1-7, identical or similar parts or components are generally indicated by identical reference numerals. The avian distractor device (10) includes a clamp (12) having a pair of jaws (13, 14) attached to a hinge (16) via a plurality of springs (18, 38). The clamp (12) includes a locking member (52) disposed in communication with the pair of jaws (13, 14) to rigidly hold a conductor (20) of different sizes using the spring force. The locking member (52) further includes threaded inserts and bolt to connect the spherical diverter (22), the hinge (16) and the clamp (12). The locking member (52) is composed of a locking cover (45, 46) for covering the locking member (52) of the clamp (12) via screws (44) to rigidly hold and lock the conductor (20). Note that the locking cover (45, 46) is made of plastic or other nonconductive, weather resistant material, based on design consideration.

In one embodiment, the avian distractor device (10) is attached to the conductor (20) through the clamp (12). Note that as utilized herein, the term conductor (20) generally refers to an elongate object such as a solid or tubular rod, pipe, strut, radio masts or towers, or the like and specifically relate to a cable, wire, line, cord, conductor, or the like suspended above the ground, such as overhead power transmission lines, whether non-energized or low voltage, medium voltage, high voltage, extra high voltage, ultrahigh voltage, as aluminum conductors reinforced with steel, bundle conductors, ground conductors, aerial cables, antennas, electrical fence, overhead cable, or the like.

Figure 2:
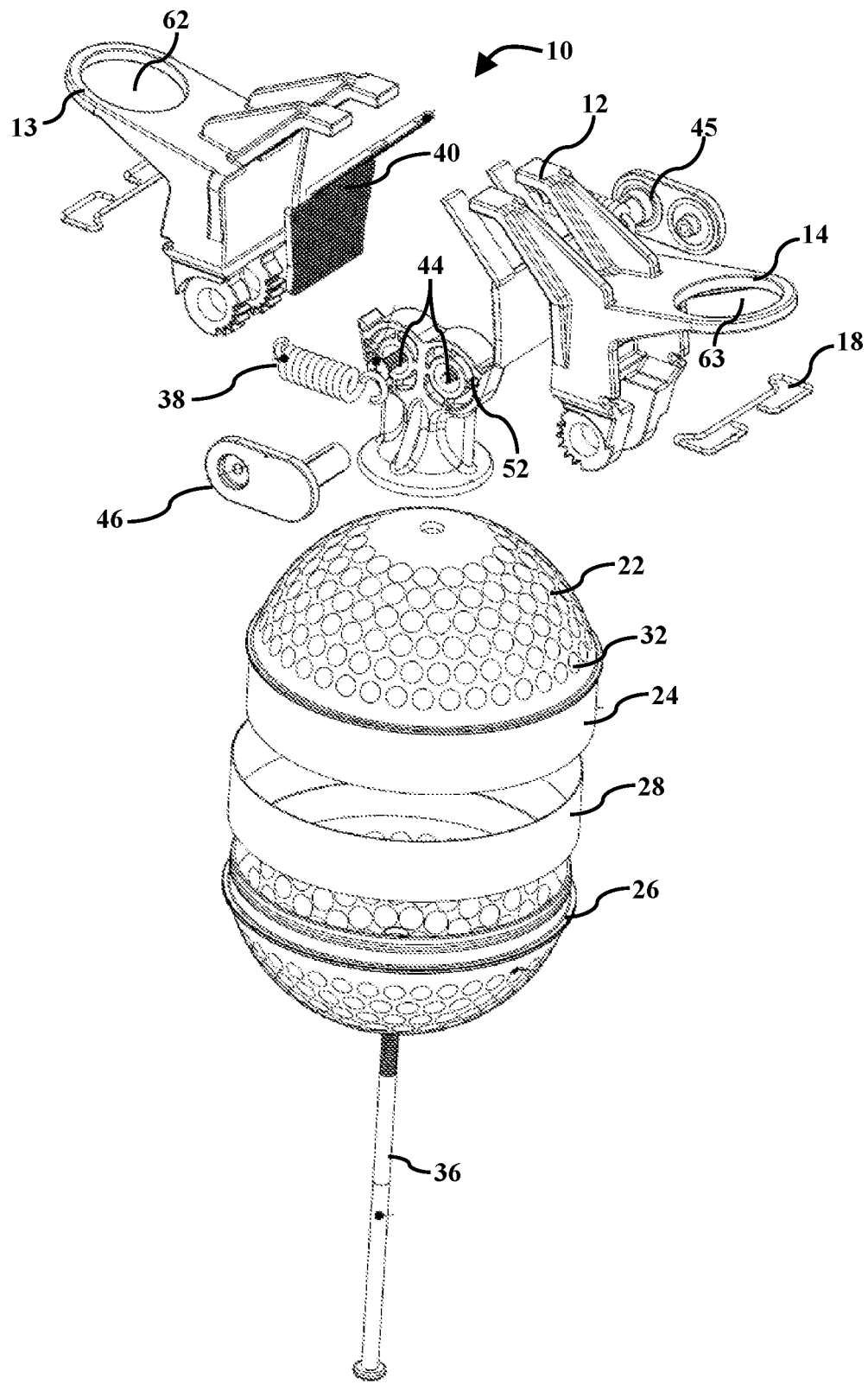
FIG. 2 illustrates an exploded view of the avian distractor device, in accordance with an exemplary embodiment of the present invention.
Figure 3:
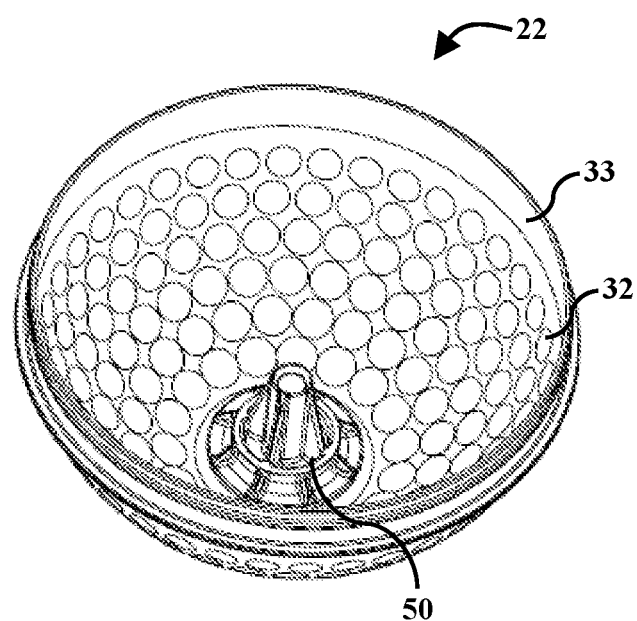
FIG. 3 illustrates a perspective view of a bottom hemisphere of the spherical diverter with a swivel molded structure, in accordance with an exemplary embodiment of the present invention.

Referring to FIG. 2, an exploded view of the avian distractor device (10) is illustrated in accordance with an exemplary embodiment of the present invention. The avian distractor device (10) is composed of a spherical diverter (22) having two interlocking hemispheres (23, 33). The interlocking hemispheres (23, 33) are mechanically interlocked via a male and female slot (24, 26) located at the ends of the interlocking hemispheres (23, 33). The spherical diverter (22) is reflective and rotates in response to the wind. A swivel molded structure (50) is located at an inner portion of the lower hemisphere (33), as shown in FIG. 3. A fastener (36) is threaded via a center portion of the spherical diverter (22) via the swivel molded structure (50) to rotatably attach the spherical diverter (22) to the hinge (16) and the clamp (12), as shown in FIG. 3. In general, a swivel is a cylindrical rod that can turn freely within a support structure. The rod is usually prevented from slipping out by a nut, washer or thickening of the rod. The lower hemisphere (33) is attached to the ends of the rod or the center. The swivel molded structure (50) located at the lower hemisphere (33) of the spherical diverter (22) allow the spherical diverter (22) to rotate as explained above.

Figure 4:
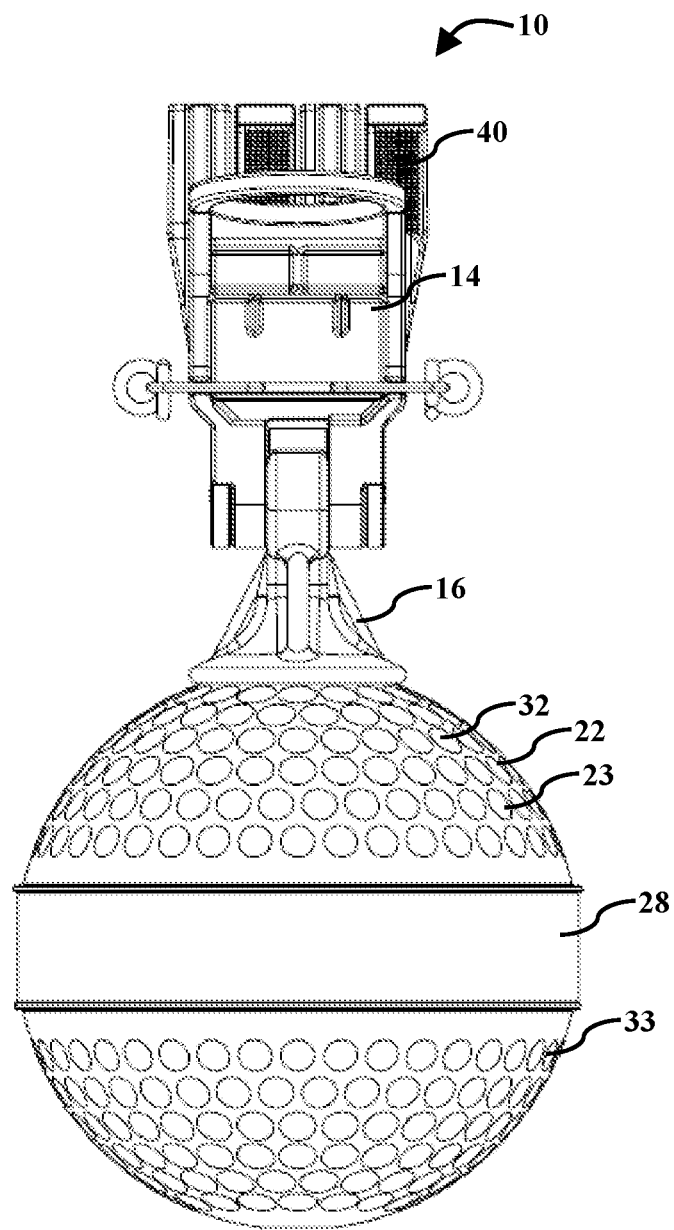
FIG. 4 illustrates a Side view of the avian distractor device, in accordance with an exemplary embodiment of the present invention.

A retro-reflective tape (28) is encircled on a central portion of the spherical diverter (22) to enhance visibility of the device (10). In general, the retro-reflective tape (28) works by reflecting light back to the light source only. In one embodiment, the spherical diverter (22) is composed of a polymer material such as, for example, polycarbonate material or polyacetal material with a photo-phosphorescence pigment to induce a night glow effect onto the spherical diverter (22), based on design consideration. In general, phosphorescence is a type of photoluminescence related to fluorescence. Unlike fluorescence, a phosphorescent material does not immediately re-emit the radiation it absorbs. The slower time scales of the re-emission are associated with "forbidden" energy state transitions in quantum mechanics. As these transitions occur very slowly in certain materials, absorbed radiation is re-emitted at a lower intensity for up to several hours after the original excitation. The retro-reflective tape (28) is adhesively attached to the central portion of the spherical diverter (22), as shown in FIG. 4.

The retro-reflective tape (28) refracts and reflects ambient light to make the diverter (22) visible to the wildlife. Note that the retro-reflective tape (28) is composed of an orange color tape, a yellow color tape or a green color tape to enhance visibility of the device (10) to the wildlife, based on design consideration.

Figure 5:
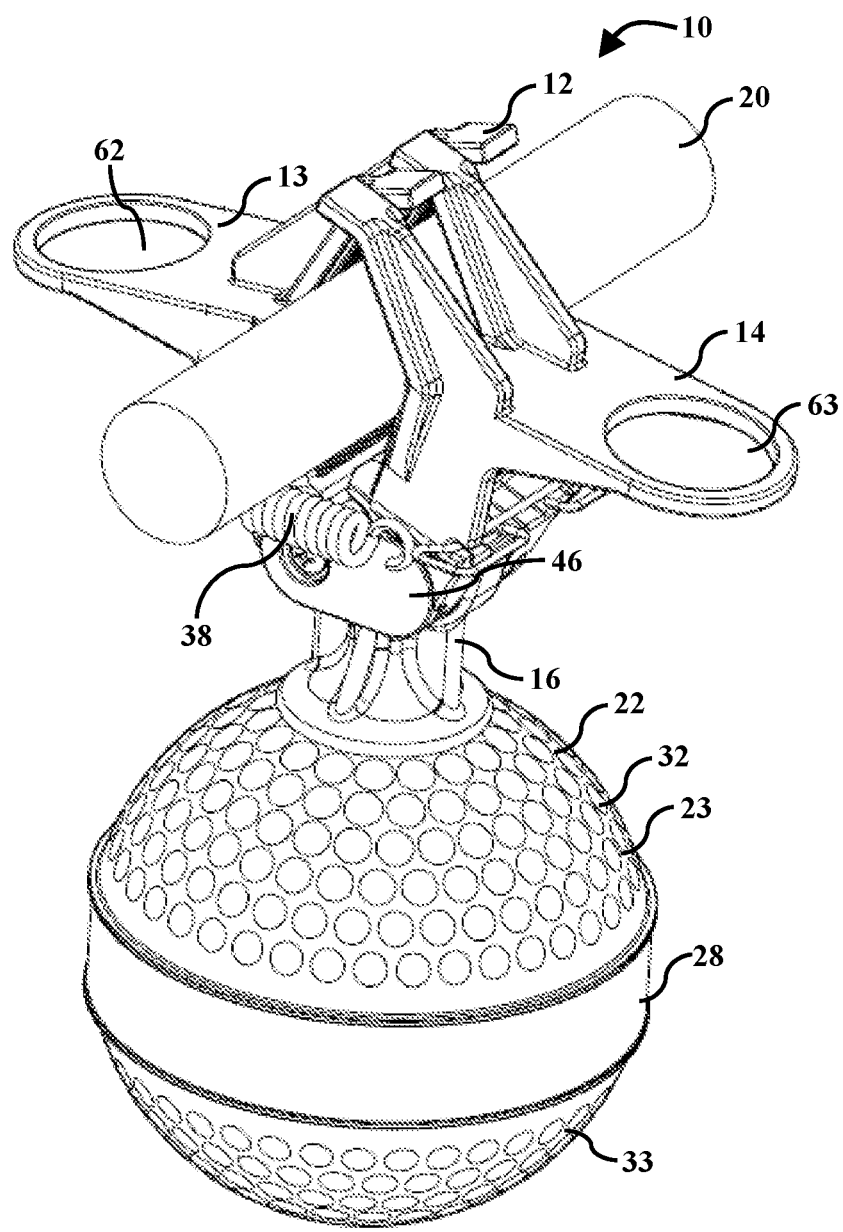
FIG. 5 illustrates a perspective view the avian distractor device that is attached a substrate (e.g., a power line, communications line or another similar structure not necessarily cylindrical in cross section). in accordance with an exemplary embodiment of the present invention.

FIG. 5 provides a side view of the avian distractor device (10) in accordance with an exemplary embodiment of the present invention. The jaws (13, 14) include a plurality of rubber inserts (40) with serrations for better flexibility and cushioning effect to hold the conductor (20). The pair of jaws (13, 14) snaps the clamp (12) on and off around the conductor (20). The avian distractor device (10) is opened by hand and closed in a "snap fit" process around the conductor (20) which can be a live conductor or guide wire. In a preferred embodiment, the avian distractor device (10) is fitted to the conductor (10) by an insulated rod. The avian distractor device (10) is also drone installable and is held by a drone using an attachment hole (62, 63) in the extension of the clamp (12), based on design consideration. These attachment holes (62, 63) also serve to provide a holding point used to open the clamp (12).

The spherical diverter (22) is translucent so that light enters within the material and emerge out through the retro-reflective tape (28) to help brighten the phosphorescence colors. A plurality of dimples (32) is located on an external surface of the spherical diverter (22) and on a connection zone between the clamp (12) and the spherical diverter (22) to reduce a drag force on the device (10). In a preferred embodiment, the dimples (32) are spherical in shape to reduce a drag force on the device (10). The avian distractor device (10) uses light through reflectance and refraction, and motion through rotation, oscillation and vibration to divert birds and wildlife away from the power line and other structures on which birds typically perch or against which birds may collide.

Figure 6:
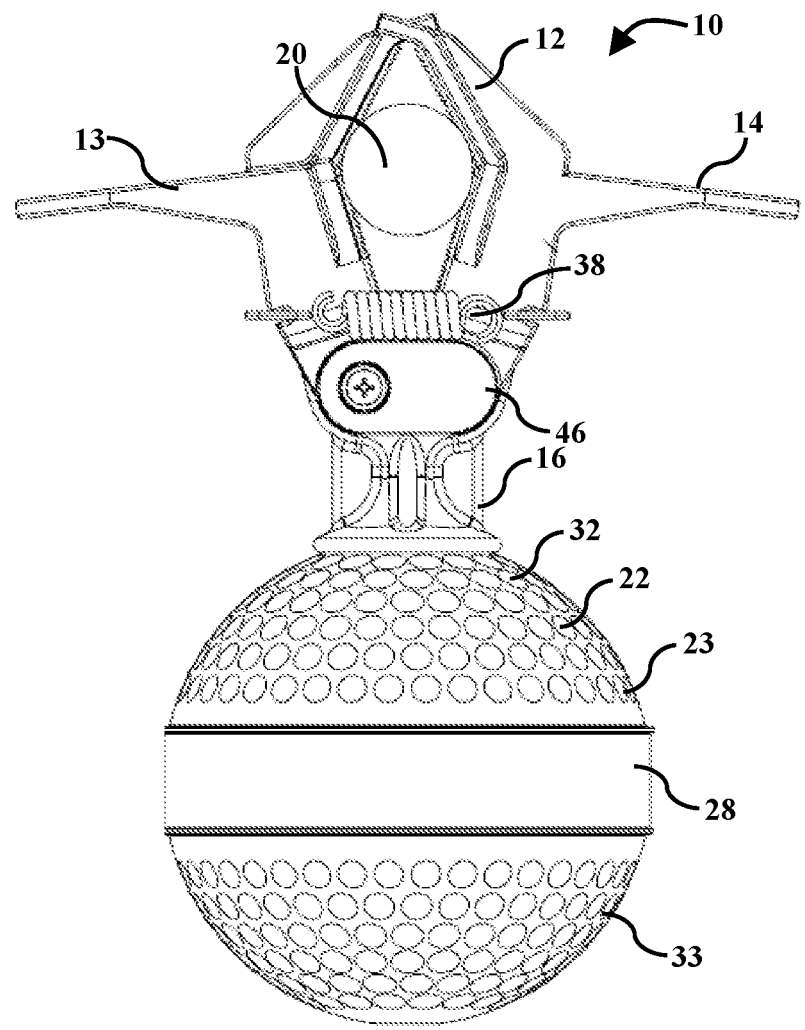
FIG. 6 illustrates a side view of the avian distractor device, in accordance with an exemplary embodiment of the present invention.

FIG. 6 is a front view the avian distractor device (10) that holds the conductor (20) in accordance with an exemplary embodiment of the present invention. The spherical shape of the diverter (22) reflects any available light in all directions and is visible from all directions including above or below the diverter (22). The clamp (12) is made of polyamide structure with ultraviolet and thermal stability to increase visibility of the device (10) to the wildlife. The polyamide structure absorbs stray light in low light conditions and will not break down under natural sunlight exposure. This type of plastic advantageously magnifies and enhances the phosphorescence material that is applied to the surface of the substrate.

Figure 7:
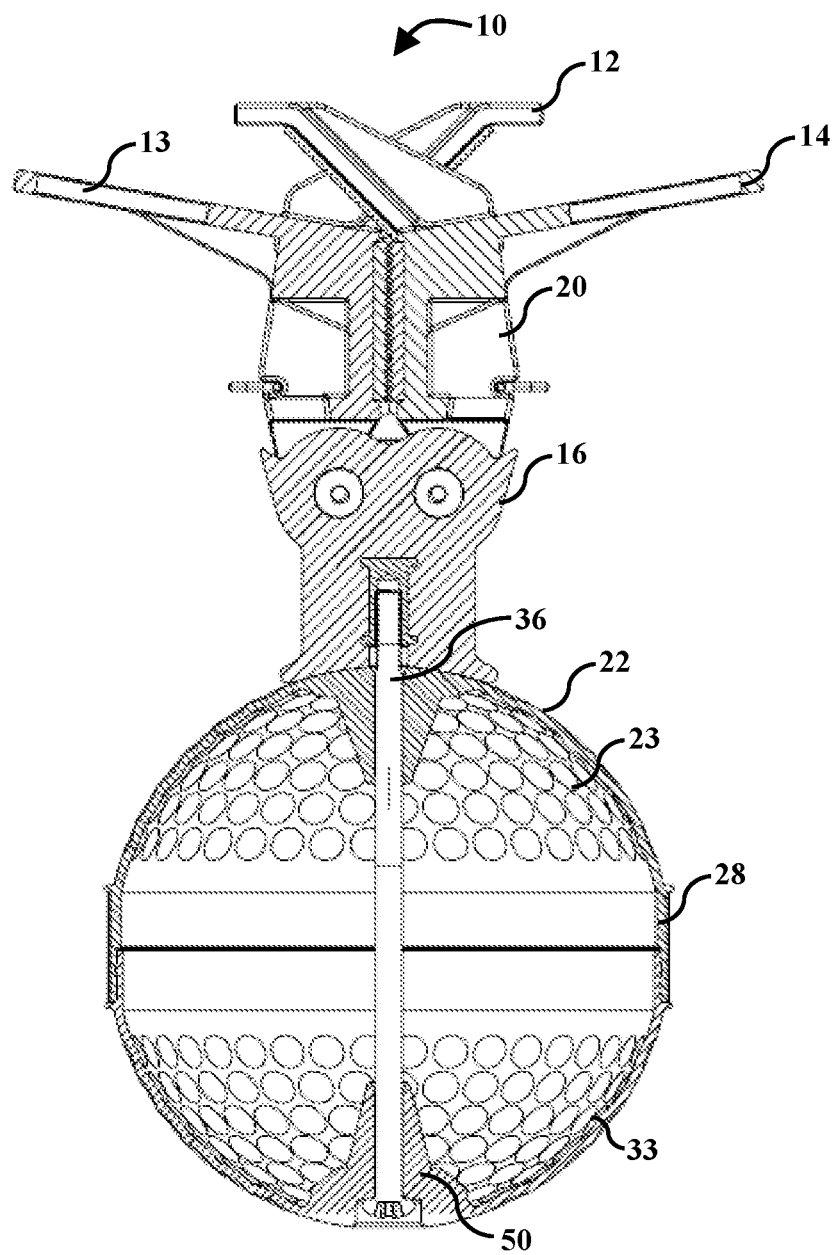
FIG. 7 illustrates a sectional view of the avian distractor device, in accordance with an exemplary embodiment of the present invention.

Referring now to FIG. 7, a sectional view of the avian distractor device (10) is illustrated in accordance with an exemplary embodiment of the present invention. The diverter (22) is preferably substantially spherical. The spherical diverter (22) with photo-phosphorescence pigments induces night glow effect on to the spherical diverter (22). The colors on the reflective tape (28) of the diverter (22) during rotation, oscillation, and/or vibrations is enhanced to approaching birds, animals and bats and thereby causing the wildlife to avoid collisions with wires.

The above-described avian distractor device (10) is lightweight, easily and quickly installed by hand. The positive grip on the conductor (20) ensures the avian distractor device (10) remains in the applied location. The avian distractor device (10) has a long service life without deterioration of material properties with minimal wind resistance. The clamp (12) snaps on and off quickly and easily. The clamp (12) is fitted by hand or by drone. The avian distractor device (10) can be any suitable size, shape, and configuration, and has a sufficiently large wind-catching surface, and is large enough to deter birds or other wildlife.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An avian distractor device, comprising:
    a clamp having:
        a pair of jaws attached to a hinge and biased into a closed position via a plurality of springs; and
        a locking member disposed in communication with the pair of jaws to rigidly hold a conductor of different sizes within the pair of jaws under a force generated by the plurality of springs;
    a spherical diverter rotatably attached to the hinge and the clamp;
    a reflective surface including a retro-reflective tape that extends continuously around and encircles a central portion of the spherical diverter to enhance visibility of the device to wildlife; and
    a plurality of dimples formed on a portion of an external surface of the spherical diverter other than the central portion having the retro-reflective tape to reduce a drag force on the device.

2. The device of claim 1, wherein the spherical diverter includes two interlocking hemispheres mechanically interlocked via a male and female slot located at its end and a fastener threaded through a center portion of the spherical diverter.

3. The device of claim 2, wherein the spherical diverter further includes a swivel structure located at an inner side of a lower hemisphere of the spherical diverter and receiving the fastener for rotatably attaching the spherical diverter to the hinge and the clamp.

4. The device of claim 1, further comprising a locking cover engaging with the locking member of the clamp via fasteners, the locking cover rigidly holding the locking member for fixing the conductor within the clamp.

5. The device of claim 1, wherein the each of the pair of jaws includes a plurality of rubber inserts to flexibly hold the conductor.

6. The device of claim 1, further comprising an attachment hole defined by each jaw of the pair of jaws.

7. The device of claim 1, wherein the clamp is a polyamide structure having an ultraviolet and thermal stability to enhance visibility and ensure long durability.

8. The device of claim 1, wherein the spherical diverter comprises a polymer material with a photo-phosphorescence pigment to induce a night glow effect onto the spherical diverter.

9. The device of claim 8, wherein the polymer material comprises a polycarbonate material or a polyacetal material.

10. The device of claim 1, wherein the spherical diverter is translucent.

11. The device of claim 2, wherein the retro-reflective tape is positioned over the male and female slot between the two interlocking hemispheres.

12. An avian distractor device, comprising:
    a spring-biased clamp;
    a locking member disposed in communication with the clamp to rigidly hold a conductor of different sizes within the clamp;
    a diverter rotatably attached to the clamp, the diverter is a spherical shape and has a reflective surface including a retro-reflective tape that extends continuously around and encircles a perimeter thereof; and
    a plurality of dimples defined on a portion of an external surface of the diverter other than a central portion having the retro-reflective tape, the dimples extending between the retro-reflective tape and an upper end of the diverter attached to the clamp, and between the retro-reflective tape and a lower end of the diverter.

13. The device of claim 12, wherein the clamp includes a pair of jaws pivotally attached to a hinge.

14. The device of claim 13, wherein each jaw of the pair of jaws includes at least one arm extending in a direction toward the other one of the pair of jaws.

15. The device of claim 12, wherein the clamp includes a pair of tension springs arranged on respective sides of the pair of jaws, the ends of each tension spring attached to a respective one of the pair of jaws.

16. The device of claim 12, further comprising a locking cover covering and engaging with the locking member of the clamp via fasteners, the locking cover rigidly holding the locking member for fixing the conductor within the clamp.

17. The device of claim 12, wherein the diverter includes two interlocking hemispheres mechanically interlocked together.

18. The device of claim 17, further comprising a fastener threaded via a center portion of the diverter via a swivel structure molded on an inner side of a lower hemisphere of the diverter to rotatably attach the diverter to the clamp.

19. The device of claim 18, wherein the fastener extends from a bottom of the lower hemisphere, through the diverter, and engages with a hinge of the clamp arranged on an upper hemisphere of the diverter.

* * * * *